United States Patent Office

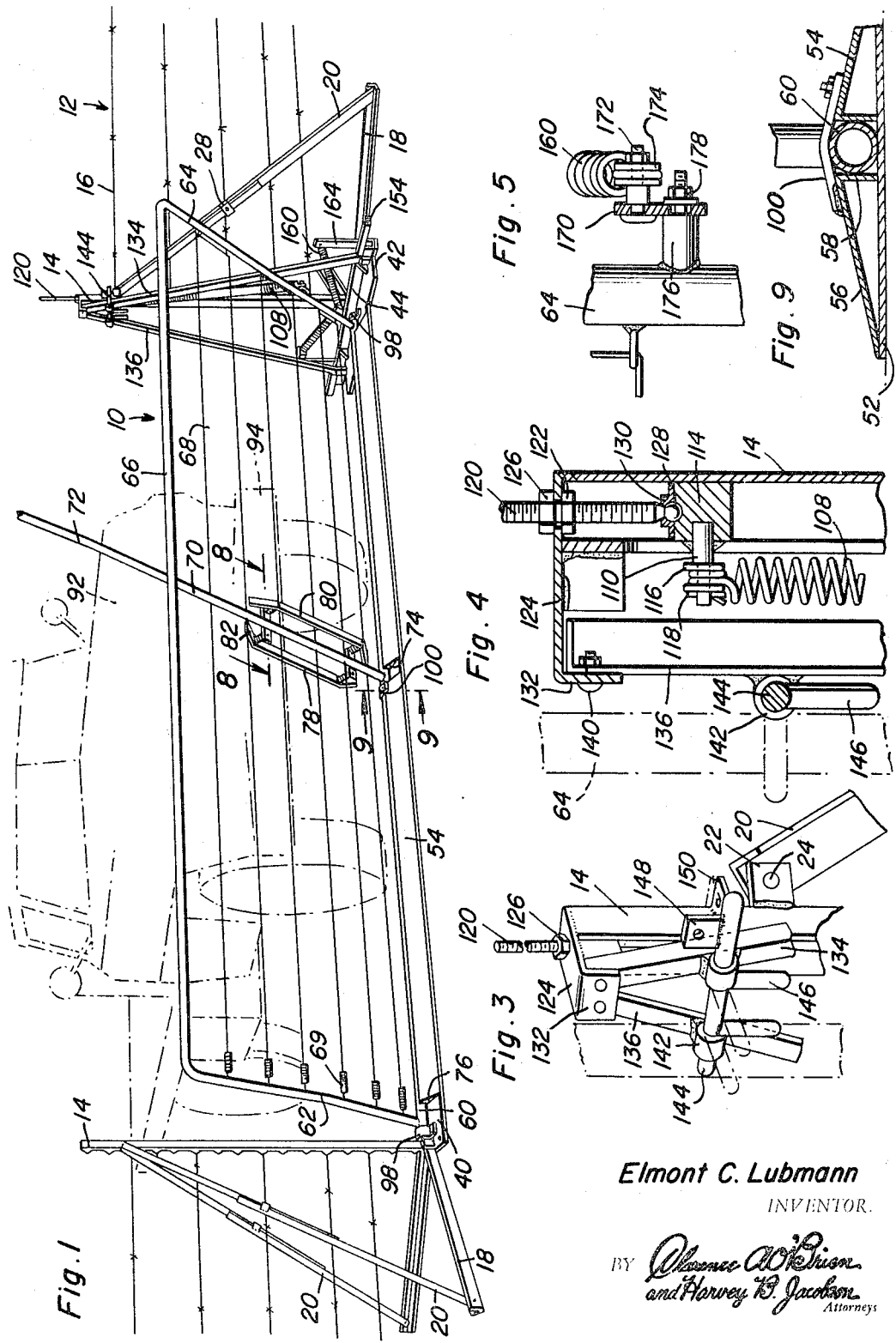

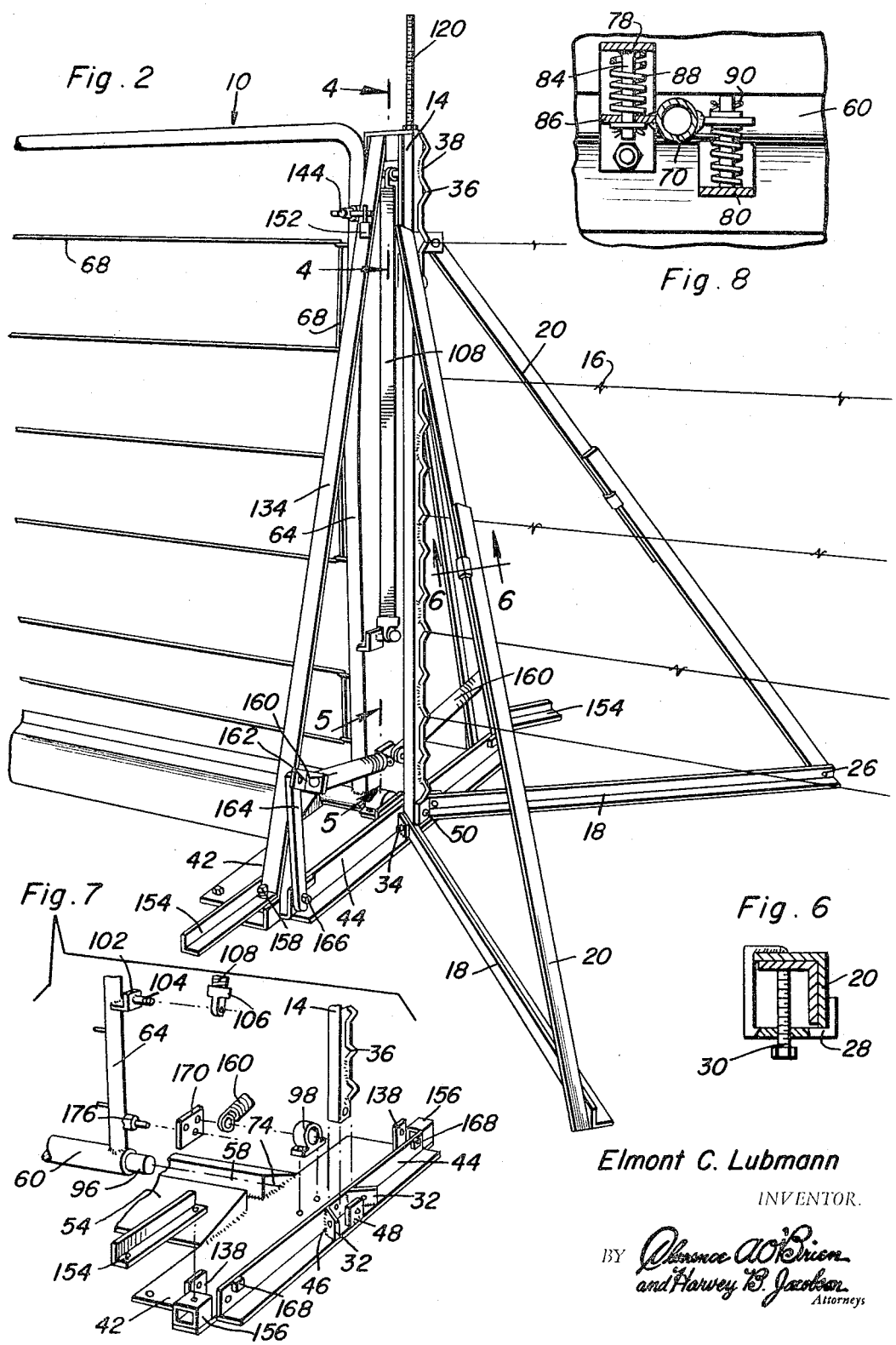

3,296,741
Patented Jan. 10, 1967

3,296,741
SPRING OPERATED GATE
Elmont C. Lubmann, Browns Valley, Calif.
(Rte. 3, Box 19201, Marysville, Calif. 95901)
Filed May 22, 1964, Ser. No. 369,482
7 Claims. (Cl. 49—131)

The present invention generally relates to a self-closing gate operated by a vehicle engaging the gate when in closed position and moving the gate to an open position after which the gate will automatically return to its closed position after the vehicle has passed through the gate opening. The structure of the present invention generally has the same objects as that disclosed in Patent No. 3,024,549 issued March 13, 1962 for Self-Closing Gate.

In many areas, fences are employed to keep in stock or otherwise enclose a particular area. Often, it is desirable to have access to the enclosed area and such access is normally provided by employing a gate in a gate opening. Conventional gates swing from a vertical axis at one edge thereof with a latch mechanism at the other end thereof and when approaching such a gate, it is necessary that the operator or a passenger in the vehicle approach the latch mechanism and manually open the gate after which the vehicle may be driven through the gate opening and then the gate closed. It is recognized that this procedure is quite time consuming and as a result thereof, gates which should be closed are quite frequently left open. Further, when the weather is adverse, opening and closing a gate can be quite objectionable.

Accordingly, it is a primary object of the present invention to provide a self-closing gate which is spring operated and provided with shock absorbing means to dampen out oscillation of the gate when it returns to its normal closed position. In carrying out the present invention, the gate is pivotally supported for pivotal movement about a horizontal axis at the bottom of the gate between two dead end gate posts whereby the gate may swing from a vertical closed position to a horizontally disposed ground engaging open position with the movement of the gate from the closed position to the open position being accomplished by the vehicle itself bumping into the gate and pushing it downwardly to the horizontal position after which the vehicle may run slowly over the gate. The gate is then returned to its normal closed vertical position by a counterbalancing spring mechanism with a spring shock absorbing mechanism being incorporated to reduce oscillation of the gate when it moves to its vertical closed position.

A further object of the invention is to provide a spring operated gate in which a latch mechanism is provided for retaining the gate in an open position.

A further object of the present invention is to provide a spring operated gate including a lock mechanism for retaining the gate in its vertical closed position.

Yet another object of the present invention is to provide a spring operated gate in which the spring force exerted by the main spring or closing spring may be adjusted for varying the resilient characteristics of the main spring.

Still another important object of the present invention is to provide a gate construction having a spring loaded bumper assembly for engagement by a vehicle to reduce damage to the vehicle and gate when the vehicle bumps the gate and pushes it from a vertical position to a horizontal position.

Yet another important feature of the present invention resides in the provision of a spring operated gate having a novel shock absorbing mechanism in the form of a pair of springs attached to the gate and pivotally anchored to an offset arm carried by a supporting base or framework which enables the free movement of the gate in one direction but will resiliently resist movement of the gate in the other direction when the gate moves past its vertical closed position after the vehicle has passed over the gate.

Still another object of the present invention is to provide a spring operated gate construction which is simple in operation, rugged, long lasting, easy to install and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the spring operated gate of the present invention illustrating the manner in which a vehicle opens the gate;

FIGURE 2 is a partial perspective view illustrating the end portion of the gate having return spring and associated mechanism interconnecting the vertical post and the gate for enabling the gate to pivot to a horizontal position and returning the gate to a vertical position;

FIGURE 3 is an enlarged fragmental perspective view illustrating the lock structure for retaining the gate in closed position;

FIGURE 4 is a detailed sectional view taken substantially upon a plane passing along section line 4—4 of FIGURE 2 illustrating the structure for adjusting the tension on the main closing spring;

FIGURE 5 is a detailed sectional view taken substantially upon a plane passing along section line 5—5 of FIGURE 2 illustrating the manner of attaching the shock absorbing springs to the pivotal gate;

FIGURE 6 is a detailed sectional view taken substantially upon a plane passing along section line 6—6 of FIG. 2 illustrating the adjustable construction of the braces and the manner of securing the adjustable sections in adjusted position;

FIGURE 7 is an exploded group perspective view illustrating the structure of the supporting base and other relative components at the bottom end of the gate;

FIGURE 8 is a detailed sectional view taken substantially upon a plane passing along section line 8—8 of FIGURE 1 illustrating the manner of mounting the bumpers resiliently on the gate; and FIGURE 9 is a detailed sectional view taken substantially upon a plane passing along section line 9—9 of FIGURE 1 illustrating the inclined ramps and the base plate structure for receiving the bottom rail of the gate.

Referring now specifically to the drawings, the numeral 10 generally designates the gate construction of the present invention which is mounted as a closure for a gate opening defined in a fence 12 by a pair of upright ends and the end posts 14 having a plurality of barbed wires 16 connected thereto. While a barbed wire fence 12 has been illustrated, it is pointed out that the gate opening may be defined in any type of fence and the gate 10 will operate just as effectively. Also, defining parts of the end posts 14 is a pair of outwardly extending diverging supporting elements 18 which are secured in ground engaging position by a pair of telescopic braces 20 which extend from the outer end of the support members 18 to a point adjacent the upper end of the post 14 where they are secured to lugs 22 by fastening bolts, pins or the like 24. Similar pins or fastening bolts 26 secure the outer ends of the braces 20 to the support members 18 and the support member 18 as well as the braces 20 are preferably of angle iron construction. Where the two sections of the braces 20 overlap and telescope, the lowermost section of the brace 20 is provided with an L-shaped bracket 28 welded thereto with a screw-threaded clamp screw 30 threaded therethrough and engaging the inner surface of one of the webs of the upper section of the angle iron brace 20. Thus, the support members 18 may be adjusted so that they will engage the ground and may be anchored to the ground if desired by any suitable ground anchors. The inner ends of the support members 18 are pivotally secured to supporting lugs 32 by fastening bolts or pins 34 or the like which enable angular adjustment of the support members 18. Thus, a generally triangular post arrangement is provided which will rigidify the supporting post 14 and form an end support for the barbed wire elements 16 which are attached to an undulated wire or rod 36 that is secured to the post 14 as by welding 38 or the like.

One end post, namely the left hand end post as illustrated in FIGURE 1 is secured to a relatively narrow supporting plate 40 by suitable upstanding lugs and fastening bolts. The other post 14, namely, the right hand post as illustrated in FIGURE 1 and the post as illustrated in FIGURE 2 is secured to a large base plate 42 having an upstanding flange 44 extending throughout the length thereof. The lugs 32 are welded to the flange 44 and the plate 42 as at 46 and an upstanding lug 48 is attached to the edge of the plate 42 generally at the center thereof and a fastener 50 extends through the flange 48, the lower end of the post 14 and the flange 44 thus rigidly affixing the supporting post 14 to the supporting plate 42.

Extending laterally from the plate 42 is an elongated narrow supporting plate 52 which extends to and forms a continuation of the base plate 40. Attached to opposed edges of the base plate 52 is a pair of ramp members 54 and 56 which have their outer edges attached to the outer edges of the plate 52 and have their inner edges spaced from each other and supported from the plate 52 by vertical plate members 58 thus defining a space therebetween 10 for receiving the lower rail 60 of the gate 10. The gate also includes end rails 62 and 64 and a top rail 66 together with a plurality of strands of wire 68 extending between the end rails 62 and 64 with it being pointed out that any suitable means may be provided within the confines of the gate frame to form a closure therefor. Each wire 68 forms two strands being continuous at one end of the gate with the ends thereof being connected to the gate by springs 69. The gate 10 also is provided with a center rail 70 having an extension 72 extending perpendicular from the top rail 16. The rails may conveniently be made of tubular pipe members secured together either by using pipe fittings, welding or the like. At the center of the supporting ramps, the ramps 54 and 56 are cut away as at 74 to enable the center frame member or rails 70 pivoted downwardly to the horizontal position. The ends of the ramps 54 and 56 terminate inwardly of the end rails 62 and 64 and the space defined by the ramp is closed by a triangular closure plate 76 which is also true of the ends of the space at the recess 74.

Mounted on the center rail 70 is a pair of vertical bumper bars 78 and 80 facing opposite sides of the gate and provided with inwardly inclined upper ends and lower end 82. The bumper bars 78 and 80 are mounted on guide rods or pins 84 which extend through apertures in laterally extending brackets 86 carried by the center rail 70. Surrounding each of the pins or rods 84 is a compression coil spring 88 interposed between the bumper bar 78 and the bracket 86 whereby the bumper bar 78 or the bumper bar 80 is resiliently supported from the bracket 86 and a transversely extending fastener such as a cotter pin 90 is provided in each of the guide rods 84 to retain the guide rods 84 slidable in the bracket 86. Thus, when a vehicle 92 approaches, the bumper 94 thereof will engage the bumper bar and cause the gate to move from a normal closed upright or vertical position to an open generally horizontal position with the springs 88 serving to cushion the initial shock when engaged by the bumper 94.

The bumper 94 will cause the gate 10 to pivot downwardly to a horizontal position and the vehicle wheel engaging the gate will retain it in horizontal position. If the front wheels run off of the gate before the rear wheels engage the gate, the extension 72 will engage the undercarriage of the vehicle thus eliminating any possible damage to the vehicle while traversing the gate. After the vehicle has passed through the gate opening and over the gate 10, the gate will return to its vertical closed position in a manner described hereinafter.

As illustrated in FIGURE 7, the ends of the bottom rail 60 is provided with a reduced axial extension 96 for reception in a bearing block 98 detachably mounted on the supporting plate 42 by any suitable fasteners thus hingedly securing the gate 10 to the mounting plates 40 and 42. At the center of the gate, the bottom rail 60 is retained in place by retaining strap 100 bridging the slot defined by the vertical support members 58 for the ramp 54 and 56.

Spaced upwardly from the bearing block 98 is an attaching bracket 102 having a threaded stud 104 extending therefrom for reception and attachment to an eye member or adapter 106 on the lower end of an elongated coil tension spring 108 which has the upper end thereof attached to a laterally projecting pin 110 carried by a sliding block 114 at the upper end of the supporting post 14. The spring 108 is retained in place by a pair of washers 116 and a suitable fastener such as a cotter pin 118 or the like. The block 114 is slidable in the flanges of the post 14 which is of channel-shaped configuration and is attached to the lower end of an elongated threaded rod 120 which is threadedly engaged with a nut 122 welded to the undersurface of a top bracket 124 carried by the upper end of the post 14. A lock nut 126 is threaded on the rod 120 and engages the upper surface of the top bracket 124 for adjustably locking the block 114 in adjusted position. The lower end of the threaded rod 120 is attached to the block 114 by a ball member 128 received in a socket member 130 secured to the block 114 thereby enabling rotation of the threaded rod 120 and also angular movement of the rod 120 in relation to the block 114 thus enabling the block 114 to tilt slightly in relation to the threaded rod 120 if desired. The upper end of the rod 120 may be provided with any suitable means by which a wrench, screwdriver or the like may be employed for rotating the threaded rod 120 and, of course, the lock nut 126 may be secured in place by a suitable wrench. Thus, the tension on the coil tension spring 108 may be adjusted for enabling the spring to effectively return various sized gates to their closed position. As illustrated in FIGURE 1, as the gate is moved from its vertical closed position toward its horizontal open position, the spring 108 will be elongated thereby tensioning the spring so that the resiliency of the spring will return the gate to its normal closed vertical position.

As illustrated, the top bracket 124 extends toward the gate and is provided with a downturned end 132 to which is secured a pair of downwardly extending and outwardly diverging angle iron braces 134 and 136 which are secured to upstanding lugs 138 welded to the supporting plate 42 with the upper end being secured to the downturned end 132 by bolt type fasteners 140 thus further rigidifying the supporting post and also providing for support of locking means for the gate to be described hereinafter.

For locking the gate 10 in closed position, the braces 134 and 136 are provided with bearing lugs 142 rotatably journalling a shaft 144 thereon. The shaft 144 is provided with a pair of laterally extending locking fingers or arms 146 rigid therewith and orientated perpendicular thereto with the fingers 146 being spaced apart a distance to closely receive the end rail 64 of the gate 10 when the fingers 146 are orientated in a position perpendicular to the plane of the braces 134 and 136. In FIGURES 3 and 4, the locking fingers are orientated in their unlocked position so that the end rail 64 may pass by the locking device without obstruction. In the dotted line position illustrated in FIGURES 3 and 4, the fingers 146 will be disposed on opposite sides of the end rail 64 thus securing the gate in its upright closed position.

One end of the rod 144 is longer than the other and projects beyond the bearing sleeve or block 142 and is provided with a laterally extending apertured lug 148 for forming a handle for manipulating the rod 144 and also engaging and aligning with an apertured lug 150 secured to the upper end portion of the brace member 134 for receiving a padlock 152 through the apertures thereof for locking the fingers 146 in their horizontally extending position for enagement on oposite sides of the end rail 64 of the gate 10 thereby locking the gate in closed position when desired. Inasmuch as the fingers 146 are longer than and are heavier than the lug 148, the fingers 146 will naturally assume a vertical depending position as illustrated in FIGURES 3 and 4 unless the padlock 152 is used to retain the lug 148 locked against or adjacent to the lug 150.

At each side of the supporting plate 42, there is also provided an angle iron locking member 154 hingedly attached to a box-type mounting bracket 156 at the end of the supporting plate 42. The locking member 154 is pivotally secured to the box-type bracket 156 by virtue of a spring loaded bolt 158 which enables some degree of pivotal movement of the locking element 154 about an axis transverse to the vertical axis defined by the bolt 158. Also, the box-type bracket 156 provides an offset for the locking member 154 so that it is disposed above the supporting plate 42 a distance generally equal to the diameter or width of the end rail 64 so that when the end rail 64 is pivoted downwardly against the top surface of the supporting plate 42 as would occur when the gate is in its fully open position, the locking element 154 may be pivoted inwardly about the pivot bolt 158 into overlying relation to the end rail 64 thereby securing the gate in its horizontal open position.

A mechanism is also provided for the reducing of oscillation of the gate 10 when it returns to its normal vertical closed position. This structure includes a pair of coil tension springs 160 having the outer end thereof attached to a bracket 162 that is attached to a pivot arm or lever 164 secured to the flange 44 by a pivot bolt 166. The stop lug 168 is provided on the flange 44 for limiting the inward swinging movement of the arm 164. The inner end of the spring 160 is attached to a connector bracket 170 by virtue of a shouldered bolt 172. The shouldered bolt receives washers 174 disposed on opposite sides of the eye or hook on the spring and the bracket 170 has the respective springs 160 attached to the upper outer corners thereof. The lower center of the bracket 170 is attached to a laterally extending stud 176 on the end rail 64 of the gate 10 and the stud 176 is shouldered and the bracket 170 is attached thereto by a retaining nut 178 thus affixing the bracket 170 to the gate 10. As illustrated, the bracket 170 is disposed below the bracket 102 and also below the upper end of the arms 164 so that the springs 160 are orientated normally in downwardly inclined position.

As the gate 10 swings downwardly such as illustrated in FIGURE 1, one of the springs will be elongated while the other of the springs merely serve to pivot the arm or lever 164 about its pivot point or bolt 166. For example, the spring on the far side of the gate as illustrated in FIGURE 1 is being elongated with the arm 164 for that spring engaging the stop abutment 168 while the near spring 160 and its arm 164 is being pivoted generally in the same direction as the gate. Then as the gate is released after the vehicle has passed thereover, the tension in the elongated spring 160 will assist the spring 108 in closing the gate and as soon as the gate passes its vertical position, the spring on the near side of the gate as illustrated in FIGURE 1 will serve to retard further movement beyond its vertical position. Thus, by subsequently retarding movement of the gate past the vertical position, the two springs 160 will serve to rapidly dampen and stop oscillation of the gate 10.

The surface in which the gate is mounted should be relatively flat and firm so that the gate will not be distorted when the vehicle passes thereover. Of course, no pressure will be exerted on the bottom rail 60 and inasmuch as the top rail 66 will be laying flat on a firm supporting surface when the wheels of the vehicle pass thereover, the top rail 66 will not be damaged nor distorted. Any suitable anchors may be used for the supporting plate depending upon the surface upon which they are installed.

As will be apparent, the use of the present gate enables a vehicle operator to drive his vehicle over the gate without the necessity of the operator of the vehicle or a passenger of the vehicle getting out of the vehicle, opening the gate and holding it open while the vehicle traverses the gate opening and then closing the gate, since all of these actions will be automatically performed. The structure still enables the gate to be effectively locked to prevent it from being opened unless a proper key is available and also, the structure enables the gate to be locked in its fully opened position when desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-closing gate structure comprising a pair of upright posts disposed in spaced aligned relation, a gate member disposed between the posts, means at the lower edge of the gate member hingedly supporting the gate member for pivotal movement about a horizontal axis from a vertical closed position between the posts to a horizontal open position, spring means interconnecting the gate member and at least one of said posts for returning the gate member to a vertical position, a stationary support spaced from one of the posts, and spring means interconnecting the gate member and said stationary support for dampening oscillation of the gate when it returns to its closed position, said dampening spring means including a pair of oppositely extending coil springs attached to the gate member adjacent the lower edge thereof, and pivotal arms mounted on the stationary support and engaging the ends of the springs, and means limiting the inward pivotal movement of the arms whereby springs on opposite sides of the gate will be tensioned as the gate oscillates to opposite sides of its vertical closed position.

2. The structure as defined in claim 1 wherein the point of connection of the two dampening springs is spaced above the point of pivotal support of the gate member but below the point of connection of the spring means for returning the gate member to a vertical position.

3. The structure as defined in claim 1 wherein said pair of posts are supported from a base member, and means on said base member in spaced relation to the posts for movement from a position in the path of movement of the gate member to a position out of the path of movement of the gate member whereby the gate member may be swung to an open position and retained in open position.

4. The structure as defined in claim 1 wherein one of said posts is provided with a pivotally mounted rod rotatable about an axis perpendicular to the side edge of the gate member when the gate is in upright closed position, a pair of laterally extending spaced pins on said rod for positioning on opposite sides of the gate member when the gate member is in closed position thereby locking the gate member in closed position, and means on said rod for engagement with coacting means on said post for retaining the pins on the rod in locked engagement with the gate member.

5. The structure as defined in claim 1 wherein said gate member includes a lower rod-like structure, an inclined ramp disposed on each side of the rod-like structure for enabling a vehicle to proceed over the rod-like structure without exerting excessive force thereon.

6. The structure as defined in claim 1 wherein said gate member is provided with a centrally disposed abutment means for engagement by a vehicle, said abutment means including oppositely extending abutment members orientated for engagement by the bumper of a vehicle, means resiliently supporting said abutment members for absorbing the initial shock of engagement of the abutment members by a vehicle bumper.

7. A self-closing gate structure comprising a pair of stationary upright posts, a gate forming a closure for the area between the posts, means pivotally connecting the lower ends of the gate and the posts for enabling swinging movement of the gate from a vertical closed position to a substantially horizontal open position, vertically extending means adjacent the center of said gate and orientated on opposite sides thereof for engagement by a bumper of a vehicle approaching the gate for forcing the gate downwardly to a substantially horizontal position so that the vehicle may pass over the gate, said means including vertical abutment members resiliently supported from the gate to cushion the impact of the vehicle bumper therewith, a pair of elongated ramps extending substantially throughout the distance between the posts and orientated on opposite sides of the lower edge of the gate with the lower edge of the gate being received between the ramps so that vehicle supporting wheels may pass over the lower edge of the gate without exerting downward force thereto, spring means interconnecting said gate and at least one of said posts for resiliently biasing the gate to an upright closed position, latch means engageable with the gate when in the horizontal position for latching the gate in an open position, latch means engaging the gate in a vertical position for retaining the gate releasably in an upright closed position, spring means interconnecting the gate and one of said posts for dampening swinging movement thereof when returning to a vertical position, said means including a pair of coil springs connected to the gate, a stationary support spaced from the gate, upstanding arms pivotally attached to the stationary support and connected to the ends of the springs for enabling oscillatory movement of the gate to be retarded by said arms and springs.

References Cited by the Examiner

UNITED STATES PATENTS

| | | | |
|---|---|---|---|
| 1,503,209 | 7/1924 | Rees | 292—332 |
| 2,007,071 | 7/1935 | Burns | 39—5 |
| 2,024,063 | 12/1935 | Roper | 39—5 |
| 3,000,596 | 9/1961 | Puffe | 39—5 X |
| 3,042,435 | 7/1962 | Wieseler et al. | 292—54 X |
| 3,089,267 | 5/1963 | Wooden | 39—5 |
| 3,170,258 | 2/1965 | Ohlhausen | 39—5 |
| 3,194,213 | 7/1965 | Soukup | 39—5 X |

FOREIGN PATENTS

| | | |
|---|---|---|
| 239,682 | 5/1960 | Australia. |
| 452,783 | 8/1936 | Great Britain. |

HARRISON R. MOSELEY, *Primary Examiner.*

D. L. TAYLOR, *Assistant Examiner.*